Aug. 25, 1959     D. H. KUHN     2,901,745
SIGNAL PROCESSING ARRANGEMENT

Filed April 26, 1957     2 Sheets-Sheet 1

INVENTOR:
DONALD H. KUHN,
BY Michael Masnik
HIS ATTORNEY.

INVENTOR:
DONALD H. KUHN,

BY Michael Masnik

HIS ATTORNEY.

2,901,745
Patented Aug. 25, 1959

2,901,745

SIGNAL PROCESSING ARRANGEMENT

Donald H. Kuhn, Syracuse, N.Y., assignor to General Electric Company, a corporation of New York Application April 26, 1957, Serial No. 655,435

7 Claims. (Cl. 343—7.7)

This arrangement relates primarily to signal processing arrangements and particularly to an arrangement for providing phase coherence of pulsed alternating signals on a pulse-to-pulse basis.

In the fields of computation, communication, object detection, etc., it is oftentimes necessary to extract time position information from response signals elicited by interrogation. For example, in an object detection arrangement of the pulse-echo type, it is desired to detect time position changes of echoes of transmitted energy pulses returned from a remote object. The time position echo information may be processed to identify the object as moving or relatively fixed in position. Systems operating to detect and display only moving objects are commonly referred to as moving target indicators. These systems oftentimes make use of locally generated reference signals to facilitate extraction of the moving object information from the returned echoes by a process of time position comparison. Arrangements are available which convert small time position changes to amplitude variations at the video level, whereupon pulse position comparison can be made at the video pulse level. In certain applications, it is desirable, however, to perform such comparisons at an intermediate frequency level. However, in order to accomplish this, it has been necessary in the past to utilize complicated circuits which have, in general, exhibited unacceptable shortcomings.

It is therefore an object of my invention to provide an improved signal processing arrangement.

Another object of my invention is to provide an improved moving target indicator arrangement providing for signal comparison at an intermeiate frequency level.

Another object of my invention is to provide an improved moving target indicator arrangment.

Another object of my invention is to provide an improved signal processing arrangement for obtaining phase coherence on a pulse-to-pulse basis wherever recurrent pulse modulated alternating signals are involved.

Another object of my invention is phase coherence information on a pulse-to-pulse basis at an intermediate frequency level where the originally transmitted signals are transmitted incoherently.

Another object of my invention is to provide an improved automatic phase control arrangement for use in coherent type moving target indicator arrangements.

In accordance with one embodiment of my invention applicable to the detection of radar echoes reflected from remote objects, a pulsed coherent oscillator is employed together with a reference oscillator in a manner to permit comparison of successively received echoes at an intermediate frequency level. The reference oscillator is synchronized with the instantaneous time delay characteristics of the delay line or time delay circuit used in the echo comparison circuit.

The features of the present invention which are believed to be novel are particularly pointed out in the appended claims.

In the drawings, Fig. 1 illustrates, in block diagram form, the distinction between the prior art and one embodiment of the present invention.

Fig. 2b illustrates, graphically, signal wave forms useful in explaining the invention of Fig. 2a.

Figure 1:
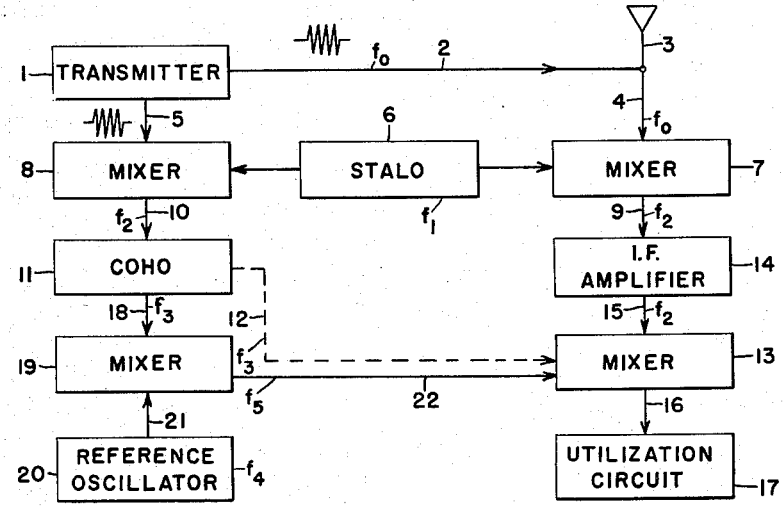

Referring to Fig. 1 there is shown one embodiment of the present invention applicable to remote object detection systems of the radar pulse-echo type. High powered radar pulses of alternating electrical signals are generated by the transmitter 1 and applied over lead 2 to an antenna 3 for transmission to remote objects in space. Antenna 3 transmits the radar pulses in a desired radiation pattern whereby pulses returned, as for example by reflection, from a remote object may be received and processed to yield position information with respect to the detected object. The received reflections or echoes are received by the antenna 3 and applied to a receiver channel over lead 4. Since the alternating signals transmitted by transmitter 1 change in phase from pulse transmission period to pulse period, it is necessary that the phase information associated with each transmitted pulse be retained and employed to permit selective detection of detected moving objects. A stable local oscillator 6 of the continuous wave type operating a frequency $f_1$ applies local oscillations at frequency $f_1$ to mixer circuits 7 and 8. Circuit 7 operates to mix received echoes of frequency $f_0$ with local oscillations at frequency $f_1$ to yield echoes at an intermediate frequency $f_2$ on lead 9. Similarly, mixer 8 operates to mix the local oscillations of frequency $f_1$ available from oscillator 6 and a portion of the transmitted pulses available over lead 5 to yield on lead 10, phase coherence information corresponding to the transmitted pulses in the form of alternating pulsed signals of frequency $f_2$. Where signals from successive pulse transmission periods are to be compared at the video pulse lever in order to yield moving target information, an arrangement employing a coherent oscillator 11 has heretofore been employed. The coherent oscillator is of any well-known variety adapted to be operated to recurrently provide oscillations of frequency $f_3$ and of an initial starting phase identical to that of the signal $f_2$ available over lead 10. In the prior art arrangement, the coherent oscillations at frequency $f_3$ are applied over a lead 12 shown in dotted line form to a mixer circuit 13. Mixer 13 mixes the $f_3$ signals available over lead 12 with the amplified received echoes at frequency $f_2$ available on lead 15 from the amplifier 14. In this prior art operating arrangement, the frequency of the signals $f_3$ are substantially equal to that of signals $f_2$ such that upon mixing in circuit 13, video pulse signals are obtained. These video pulse signals are then applied over lead 16 to a utilization circuit 17. The utilization circuit 17 may comprise delay line circuits permitting the video pulses corresponding to successively received echoes to be compared on a pulse-to-pulse basis to yield moving target information. This information may then be further processed to yield position data as to the remote object being detected.

Where it is desired to secure the comparison of successively received echoes at an intermediate frequency level, applicant has discovered the following arrangement to satisfy this purpose. The coherent pulse oscillations available from the coherent oscillator 11, instead of being applied directly over lead 12 to the mixer 13, are applied over lead 18 to mixer circuit 19. Mixer circuit 19 mixes the $f_3$ signals available on lead 18 with a continuous reference oscillation signal of a frequency $f_4$ available on lead 21 from the oscillator 20. The resultant output of the mixer circuit 19 comprises continuous oscillations at a frequency $f_5$ in which the phase information associated with each pulse generated by transmitter 1 has been retained. The signals at a frequency $f_5$ are applied over lead 22 to the mixer circuit 13 for mixing with the $f_2$ signals available on lead 15. Since the frequencies of the signals $f_2$ and $f_5$ are not substantially identical as previously described, mixer 13 yields echo pulses at an intermediate frequency $f_6$ with pulse-to-pulse phase coherence established. Utilization circuit 17 now provides phase comparison information at an intermediate frequency level.

Figure 2A:
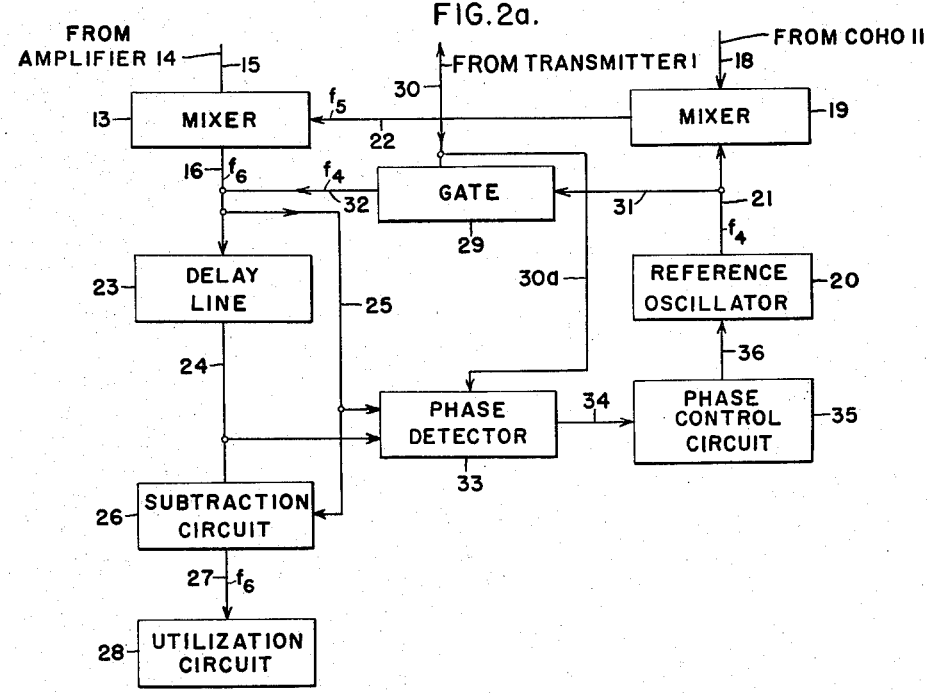
Fig. 2a illustrates a further embodiment of the present invention.

For further details of the operation of the utilization circuit 17, in accordance with the present invention, and the characteristics of the reference oscillator 20, reference is made to Fig. 2a. Wherever possible, elements common to Figs. 1 and 2a have been identified in Fig. 2a by the same reference numbers. Applicant has discovered that in order to permit signal comparison at the intermediate frequency level rather than at a video pulse level, the reference oscillator 20 must exhibit certain characteristics. Signal comparison at an intermediate level can be performed if the phase of the reference oscillations from 20 are maintained such that the same integral number of complete oscillations of the same phase are made to occur during the successive time delay periods introduced by the time delay circuits in the signal comparison portion of the moving target indicator or arrangement. The continuous oscillations $f_5$, available from mixer 19, and the received echo pulses at frequency $f_2$, available over lead 15, are mixed in circuit 13 to yield phase coherent echo pulses at an intermediate frequency $f_6$ on lead 16. To obtain signal comparison of successively received pulse echoes, the echo corresponding to an initial pulse transmission period is applied to a time delay circuit 23. Time delay circuit 23 may be of any conventional form, such as a quartz delay line, which operates to deliver on output lead 24 echo pulses received on its input lead 16 with a time delay corresponding to the time between successive pulse transmissions by antenna 3. Echo pulses available on lead 16 are also applied directly over lead 25 to the subtraction circuit 26. Subtraction circuit 26 compares the echo pulses received directly over lead 25 and the time delayed echo pulses received over lead 24 to yield difference signals on output lead 27. These difference signals $f_6$ occur at an intermediate frequency level. Because of the previous signal processing operations, echoes from stationary objects have been cancelled out and only moving object echo information, at an intermediate frequency level, is available over lead 27. This moving object information is then applied to utilization circuit 28 which may involve further processing or indication of information relating to moving objects.

It should be noted that the delay and undelay channels feeding the subtraction circuit 26 include amplification control circuits insuring that the delayed and undelayed signals passing therethrough incur no relative amplitude change.

Figure 2B:
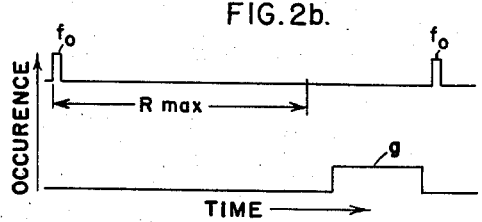

In order to insure that the reference oscillator 20 supplies an integral number of complete oscillations during the time delay period introduced by the delay line 23, it is desirable to provide an automatic control arrangement. Such a control arrangement will now be described with reference to Fig. 2a. Reference oscillations $f_4$ from lead 21 are applied to mixer circuit 19 for mixing with the pulsed coherent oscillations $f_3$ available on lead 18 from oscillator 11 shown in Fig. 1. The resultant signals $f_5$ are applied over lead 22 to the mixer circuit 13, as heretofore described, to provide phase coherent echoes at an intermediate frequency level $f_6$ on the output lead 16 after mixing with the $f_2$ signals. In order properly to maintain the operation of oscillator 20, as previously described, gate circuit 29 is provided. This gate circuit, synchronized with the pulse transmissions from transmitter 1 by control signals available over lead 30, operates to recurrently gate a portion of the reference oscillations $f_4$ available on lead 31 to the output lead 32. The manner in which the gating is accomplished can be readily understood by reference to the waveforms of Fig. 2b, wherein the time occurrence of signals is plotted as ordinate and time is plotted as abscissa. In Fig. 2b $f_0$ represents the recurrent radar pulses transmitted by transmitter 1 toward remote object in space. R max constitutes the maximum operating range of the pulse echo object detection arrangement. The gating circuit 29 is adapted to gate signals of frequency $f_4$ during the time period $g$ occurring outside the maximum range and before the next successive radar pulse transmission $f_0$.

The gated reference oscillations $f_4$ available on lead 32 of Fig. 2a are applied, in a manner similar to the echo pulses $f_6$, through the delay line 23 to appear at the output lead 24 with a time delay corresponding to the time between successively transmitted pulses and also in an undelayed form on lead 25. The delayed and undelayed gated signals $f_4$ are then applied to a phase detector 33. Phase detector 33, recurrently rendered operative by gate signals G available over lead 30a, provides at its output lead 34 a video pulse of a duration substantially equal to that of the gate signals G and having an amplitude and a polarity depending upon the relative phase of the gated reference oscillations $f_4$ available on leads 24 and 25. If the reference oscillator 20 is delivering oscillations of the same phase during the successive radar transmission periods, then the output of the phase detector would be of zero value. However, if the phase of the oscillations supplied by 20 is such that the desired relationship is not obtained, then an output control signal is available on lead 34 with a polarity and amplitude causing the phase control circuit 35 to change the operation of oscillator 20 and thereby the phase of the oscillations $f_4$ in a direction and to an amount sufficient to achieve the desired relationship.

If the delay line is assumed to be stable such that its time delaying characteristics do not vary from pulse period to pulse period, then the circuit arrangement disclosed will operate to correct any shift in frequency due to operation of the oscillator 20. However, the phase control arrangement disclosed is equally suitable to compensate for shifts in the time delaying characteristics of the line 23, such that proper signal comparison can be achieved at the intermediate frequency level for all successive pulse periods.

Figure 3:
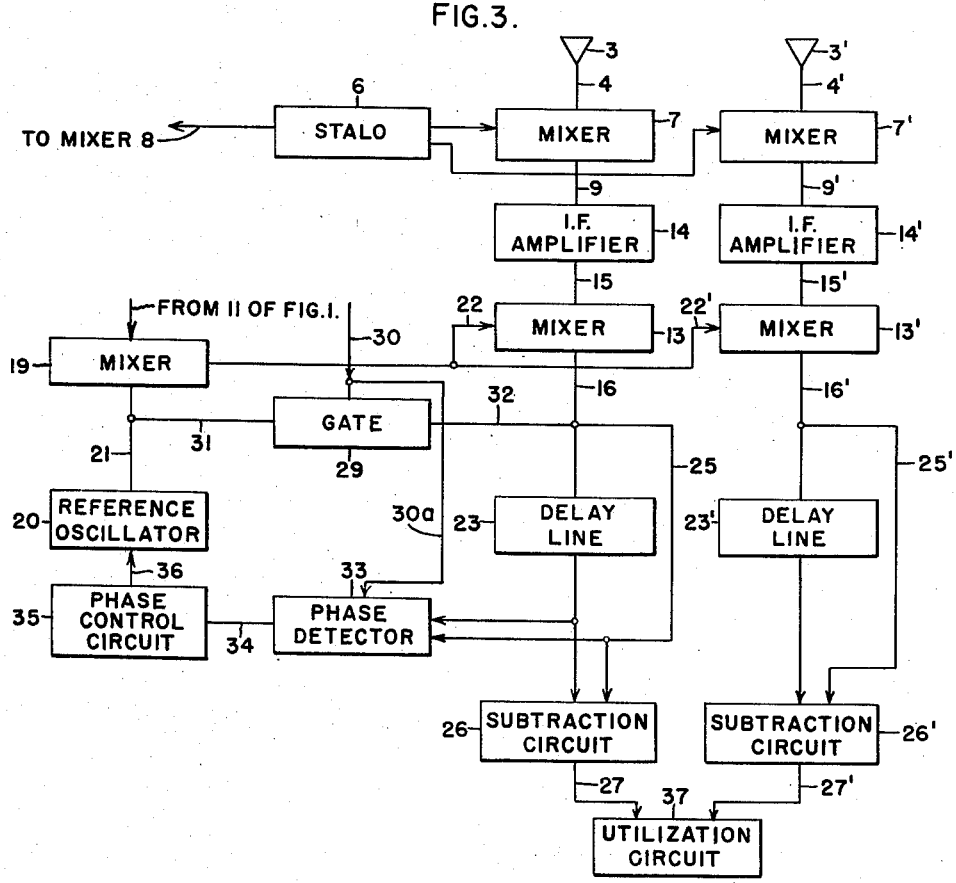
Fig. 3 illustrates, in block diagram form, an application of the present invention to a pulse echo system employing multiple reception channels.

Although the invention has been described as being useful in accommodating a single echo reception channel, the invention can readily be extended to a plurality of signal reception channels as shown in Fig. 3. Wherever possible, elements common to Figs. 1, 2 and 3 have been retained in Fig. 3 with a common reference number. In addition, the second reception channel has been identified by primed reference numerals indicating their similarity to the elements of the single reception channel shown in Fig. 2a.

An application of the invention involving more than one reception channel is shown in Fig. 3. Echoes corresponding to radar pulses transmitted to remote objects are received on two separate antennas 3 and 3'. The echoes are passed through separate channels, in a manner similar to that previously described, to a utilization circuit 37 to provide improved echo information. To simplify the discussion, it is assumed that the delay line 23' operates identically to that of delay line 23. Accordingly, the reference oscillator 20 is synchronized with the operation of one of the delay lines, for example, delay line 23, in the manner previously described in connection with Fig. 2a and operates to provide properly phased oscillations during the time delay period established by delay line 23 and 23' so as to insure proper phase coherence for echoes received in both channels. Thus the echo pulses at an intermediate frequency level corresponding to those received on antenna 3 and 3' are processed and applied to the respective subtraction circuits 26 and 26'. Subtraction circuits 26 and 26' yield on their output leads 27 and 27' the desired pulse echoes corresponding only to moving targets and at an intermediate frequency level. It is obvious that the present invention can be extended to cover additional signal reception channels.

While a specific embodiment has been shown and described, it will of course be understood that various modifications may yet be devised by those skilled in the are which will embody the principles of the invention and found in the true spirit and scope thereof.

What I claim and desire to secure by Letters Patent of the United States is:

1. In an object detection system of the pulse echo type wherein means are provided for periodically transmitting pulses to remote objects and for receiving echoes at a first carrier frequency of said transmitted pulses returned from said object, means for providing signals representing the timing between the transmission of a pulse and the reception of an echo thereof which is independent of the phase with which said pulse is transmitted comprising a coherent oscillator responsive to a portion of said transmitted pulses for providing coherent oscillations of a second carrier frequency having a phase corresponding to that of succesively transmitted pulses, a source of continuous, stable frequency reference oscillations of a third carrier frequency, means for mixing said third carrier frequency reference oscillations with said coherent oscillations of second carrier frequency to provide first mixed oscillations of a fourth carrier frequency, means for mixing said first mixed oscillations with said received echoes to provide second signals of a fifth carrier frequency, and means for utilizing said second signals.

2. In an object detection system of the pulse echo type wherein pulses are transmitted at a given pulse recurrence rate to remote objects and echoes of said transmitted pulses, returned from said object, are received, a source of stable local oscillations, means for mixing said local oscillations with said received echoes to provide echoes at an intermediate frequency level, means for mixing said local oscillations with a portion of said transmitted pulses for providing a first control signal, a coherent oscillator responsive to said first control signal for providing coherent oscillations having a phase corresponding to that of successively transmitted pulses, a source of continuous, stable frequency reference oscillations, means for mixing said reference oscillations with said coherent oscillations to provide second oscillations, means for mixing said second oscillations with said echoes at an intermediate frequency level to provide third oscillations at an intermediate frequency level, a delay line responsive to a signal applied to its input circuit to provide said signal at its output circuit with a time delay equal to the recurrence period between transmitted pulses, a subtraction circuit, means for applying said reference oscillations and said third oscillations to said delay line to provide time delayed third oscillations and time delayed reference oscillations, means for applying undelayed and said delayed third oscillations to said subtraction circuit to derive difference oscillations, means for detecting the relative phase between said time delayed and undelayed reference oscillations to provide a fourth control signal, means for maintaining an equality between the time delay period of said delay line and an integral number of oscillations of said reference oscillator comprising means for controlling the phase of said reference oscillations in accordance with said fourth control signal, and means for utilizing said difference oscillations.

3. In an object detection system of the pulse echo type wherein means are provided for periodically transmitting pulsed waves to remote objects and for receiving echoes of said transmitted pulsed waves returned from said object, means for providing a signal representative of the time between the transmission of a pulse and the reception of an echo thereof which is independent of the phase with which said pulsed waves are transmitted comprising a source of stable local oscillations, means for mixing said local oscillations with said received echoes to provide echoes at an intermediate frequency level, means for mixing said local oscillations with a portion of said transmitted pulses for providing a first signal, a coherent oscillator responsive to said first signal for providing coherent oscillations having a phase corresponding to that of successively transmitted pulsed waves, a source of continuous, stable frequency reference oscillations, means for mixing said reference oscillations with said coherent oscillations to provide second oscillations, means for mixing said second oscillations with said echoes at an intermediate frequency level to provide output oscillations at an intermediate frequency level, and means for utilizing said output oscillations.

4. In combination, means for transmitting pulsed oscillations to a remote object at a given pulse recurrence frequency, a plurality of channels for receiving echoes of said transmitted pulsed oscillations returned from said remote object, means for providing coherent oscillations having a phase corresponding to that of said transmitted pulsed oscillations, a source of reference oscillations, means for mixing said coherent oscillations with said reference oscillations to provide first mixed oscillations, means for separately mixing said first mixed oscillations with the echoes received in each of said channels to provide a plurality of separate second mixed oscillations, a plurality of delay lines each responsive to an applied signal for providing said signal with a time delay equal to the period corresponding to said pulse recurrence frequency, means for providing a plurality of time delayed second mixed oscillations and time delayed reference oscillations comprising means for applying each of said second mixed oscillations to a respective delay line and means for applying said reference oscillations to at least one of said delay lines, a plurality of subtraction circuits, means for subtracting each of said delayed second mixed oscillations with corresponding undelayed second mixed oscillations from said receiving channels to provide a plurality of difference signals, means for comparing the relative phase of said delayed reference oscillations and undelayed reference oscillations from said source to provide a control signal, means for controlling the phase of said reference oscillations in accordance with said control signal, and means for utilizing said difference oscillations.

5. In combination, means for recurrently transmitting pulses to remote objects and for receiving echoes of said transmitted pulses returned from said object, means for providing signals representing the timing between the transmission of a pulse and the reception of an echo thereof which is independent of the phase with which said pulse is transmitted comprising a coherent oscillator responsive to a portion of said transmitted pulses for providing coherent oscillations having a phase corresponding to that of successively transmitted pulses, a source of continuous, stable frequency reference oscillations, means for mixing said reference oscillations with said coherent oscillations to provide first mixed oscillations, means for mixing said first mixed oscillations with said received echoes to provide second signals, means for time delaying a portion of said second signals by a time period equal to that between recurrently transmitted pulses to provide time delayed second signals, means for obtaining a signal representing the difference between said delayed and undelayed second signals, means for maintaining a predetermined relationship between the time delay period of said time delaying means and the period corresponding to an integral number of oscillations of said source of reference oscillations, and means for utilizing said difference signals.

6. An object detection system of the pulse echo type comprising means for transmitting pulses at a given pulse recurrence rate to remote objects, means for receiving echoes of said transmitted pulses returned from said object, a coherent oscillator responsive to a portion of said transmitted pulses for providing coherent oscillations having a phase corresponding to that of successively transmitted pulses, a source of continuous, stable frequency reference oscillations, means for mixing said reference oscillations with said coherent oscillations to provide second oscillations, means for mixing said second oscillations with said echoes to provide third oscillations at an intermediate frequency level, circuit means responsive to a signal to provide said signal with a time delay equal to the recurrence period between transmitted pulses, a subtraction circuit, means for applying said reference oscillations and said third oscillations to said circuit means to provide time delayed third oscillations and time delayed reference oscillations, means for applying undelayed and said delayed third oscillations to said subtraction circuit to derive difference oscillations, means for detecting the relative phase between said time delayed and undelayed reference oscillations to provide a fourth control signal, means for controlling the phase of said reference oscillations in accordance with said fourth control signal, and means for utilizing said difference oscillations.

7. In an object detection system of the pulse echo type wherein pulses are transmitted at a given pulse recurrence rate to remote objects and echoes of said transmitted pulses, returned from said object, are received, a coherent oscillator responsive to a portion of said transmitted pulses for providing coherent oscillations having a phase corresponding to that of successively transmitted pulses, a source of continuous, stable frequency reference oscillations, means for mixing reference oscillations with said coherent oscillations to provide first mixed oscillations, means for mixing said first mixed oscillations with said echoes to provide second mixed oscillations at an intermediate frequency level, means responsive to an applied signal for providing said signal with a time delay equal to the recurrence period between transmitted pulses, a subtraction circuit, means for applying said reference oscillations and said second mixed oscillations to said time delay means to provide time delayed second mixed oscillations and time delayed reference oscillations, means for applying undelayed and said delayed second mixed oscillations to said subtraction circuit to derive difference oscillations, means for detecting the relative phase between said time delayed and undelayed reference oscillations to provide a third control signal, means for controlling the phase of said reference oscillations in accordance with said third control signal, and means for utilizing said subtracted oscillations.

References Cited in the file of this patent
UNITED STATES PATENTS
2,659,076     Emslie _____ Nov. 10, 1953